3,699,073
ROOM TEMPERATURE CURABLE ORGANO-
POLYSILOXANE COMPOSITIONS
Tadashi Wada, Kunio Itoh, Kiyoshi Imai, and Hiroshi Inomata, Annaka, Japan, assignors to Shinetsu Chemical Company
No Drawing. Filed Aug. 7, 1970, Ser. No. 62,157
Claims priority, application Japan, Aug. 15, 1969,
44/64,601
Int. Cl. C08g 51/04
U.S. Cl. 260—37 SB  7 Claims

ABSTRACT OF THE DISCLOSURE

Organopolysiloxane compositions curable at room temperature and consisting of:

(1) 100 parts by weight of an organopolysiloxane having a viscosity of from 10 to 300,000 cs. at 25° C. and represented by the general formula:

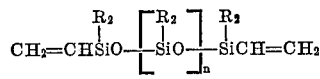

(where R is the same or a different kind of monovalent hydrocarbon radical, free of aliphatic unsaturation, and $n$ is an integer of from 8 to 1,500), (2) from 0 to 100 parts by weight of an organosiloxane copolymer composed of:

(a) $SiO_2$ units, (b) $R_3SiO_{0.5}$ units and (c)

$$CH_2=CH(R_2)SiO_{0.5}$$

units, (where R is as previously defined, and the molecular ratio of each of the units is $(b+c)/a=0.3-3$, and $c/a=0.01-1$), (3) from 0.01 to 200 parts by weight of an organosiloxane copolymer whose main chain is composed either of (d) RR'SiO units or of (d) RR'SiO units and (e) $R'SiO_{1.5}$ units, and is terminated with $R''(R_2SiO_{0.5}$ units, $R''OSi(R'_2)O_{0.5}$ units, or $HOSi(R'_2)O_{0.5}$ units, (where R is as previously defined, and at least 1 mole percent of R' group is of vinyl radicals, with the rest being of the same or different kind of monovalent hydrocarbons, free of aliphatic unsaturation, and R'' is either saturated or unsaturated monovalent hydrocarbon radicals, where the ratio of each of the units is $e/(d+e) \leq 0.5$), (4) an organohydrogen polysiloxane in which the total number of Si–H bonds is from 50 to 500 percent of that of vinyl radicals contained in Components (1), (2) and (3) given above and which contains at least three Si–H bonds in one molecule, (5) from 1 to 500 parts by weight of an inorganic filler, and (6) a catalytic amount of a platinum compound.

Such compositions have excellent processability, because they can be cured in a desired time. Therefore, they are very useful as potting or molding materials as well as coating materials on substrates.

SUMMARY OF THE INVENTION

This invention relates to organopolysiloxane compositions, which are curable at room temperature, or more particularly to improved two-package-type organopolysiloxane compositions, which are curable at room temperature by the addition reaction between an organopolysiloxane containing vinyl radicals and an organohydrogen polysiloxane.

It is well known in the art that a mixture consisting of an organopolysiloxane terminated with silicone atoms which are bonded to vinyl groups; an organosiloxane copolymer consisting of $SiO_2$ units, $R_3SiO_{0.5}$ units and $CH_2=CH(R_2)SiO_{0.5}$ units; and an organohydrogen polysiloxane, is cured rapidly at room temperature, in the presence of a platinum catalyst, to give an excellent silicone rubber (Cf. U.S. Pat. 3,436,366). But if some filler such as pulverized silica is added, in addition to the catalyst, to the mixture, the catalytic action will be greatly accelerated, so that in potting, coating or molding, the curing action often proceeds too rapidly for the easy handling of the compositions. Reducing the amount of platinum catalyst does not overcome this difficulty and the desired pour time cannot be obtained.

In order to solve the problem, addition of the following materials has been proposed: quinoline, picoline, N,N-dimethylformamide, benzotriazole, trialkyl phosphine, and the like. These materials retard the activity of the platinum catalyst, thereby reducing the curing velocity and keeping the fluidity of the mixture, during its processing. But it is difficult to keep the curing velocity in the desired range by controlling the amount of the catalyst, and sometimes it will take as long as several days or weeks for such a mixture to be completely cured so as to develop sufficient physical strength.

An object of the present invention is to produce organopolysiloxane compositions which are curable at room temperature and are free from the above-given disadvantages. Another object of the invention is to produce organopolysiloxane compositions which are curable at room temperature, and have controlled curing velocity, and excellent processability in potting, molding and coating.

The organopolysiloxane compositions of the invention which are curable at room temperature consist of:

(1) 100 parts by weight of an organopolysiloxane having a viscosity of from 10 to 300,000 cs. at 25° C. and represented by the general formula:

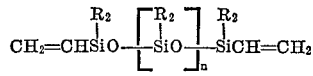

(where R is the same or a different kind of monovalent hydrocarbon radical free of aliphatic unsaturation, and $n$ is an integer of from 8 to 1,500).

(2) from 0 to 100 parts by weight of an organosiloxane copolymer composed of:

(a) $SiO_2$ units, (b) $R_3SiO_{0.5}$ units, and (c)

$$CH_2=CH(R_2)SiO_{0.5}$$

units (where R is as previously defined, and the molecular ratio of each of the units is $(b+c)/a=0.3-3$, and $c/a=0.01-1$.

(3) from 0.01 to 200 parts by weight of an organosiloxane copolymer whose main chain is composed either of (d) RR'SiO units or of (d) RR'SiO units and (e) $R'SiO_{1.5}$ units, and is terminated with $R''(R_2)SiO_{0.5}$, $R''OSi(R'_2)_{0.5}$ or $HOSi(R'_2)O_{0.5}$ units, (where R is as previously defined, and at least 1 mole percent of R' group is of vinyl radicals with the rest being of the same or different kind of monovalent hydrocarbon radicals free of aliphatic unsaturation, and R'' is either a saturated or unsaturated monovalent hydrocarbon radical, and where the ratio of each of the units is $e/(d+e) \leq 0.5$.)

(4) an organohydrogen polysiloxane in which the total number of the Si-H bonds is from 50 to 500% of that of vinyl radicals contained in Components (1), (2) and (3) given above, and which contains at least three Si-H bonds in one molecule, (5) from 1 to 500 parts by weight of an inorganic filler, and (6) a catalytic amount of a platinum compound.

To give a more detailed description of the invention, we have observed that when a small amount of the above-specified organopolysiloxane, given as Component (3) and having in its molecular chain a high content of vinyl radicals, is added to the composition consisting of Components (1), (2), (4) and (5), the curing velocity of the composition, accelerated by the platinum catalyst, will be retarded without any addition of other substances as has hitherto been practiced. Further, the composition is kept pourable while it is processed, viz, while it is potted or molded, and then cures quite rapidly to give a silicone rubber which is not deteriorated by other substances.

Component (1) given above is a linear polysiloxane whose molecular chain is terminated with vinyl diorganosilyl radicals. It is prepared, for example, by cohydrolyzing corresponding chlorosilanes or alkoxysilanes, or by subjecting divinyltetraorganodisiloxane and diorganosiloxane to an equilibrium reaction. It is composed of two or more kinds of organosiloxy units and is represented by the following general formula:

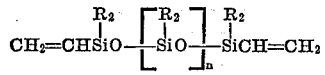

(where R and $n$ are as previously defined). It has a viscosity of from 10 to 300,000 at 25° C. The monovalent hydrocarbon radicals free of aliphatic unsaturation and given by R in the formula are preferably methyl or phenyl radicals, and the structures of such organopolysiloxanes are given by:

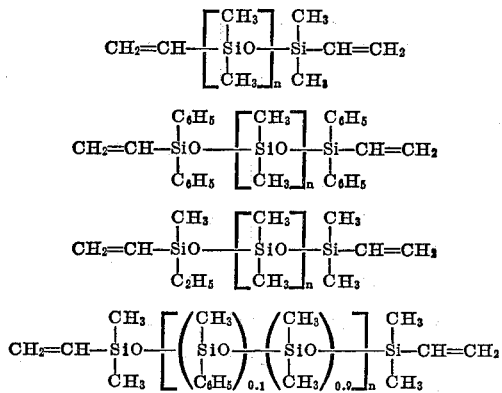

Component (2) is a copolymer composed, as mentioned above, of (a) $SiO_2$ units, (b) $R_3SiO_{0.5}$ units, and (c) $CH_2\!\!=\!\!CH(R_2)SiO_{0.5}$ units, which can be varied by varying the molecular ratios of $(a)$, $(b)$ and $(c)$. For practical uses, the value of $(b+c)/a$ is preferably from 0.3 to 3, or more preferably, from 0.6 to 2, or still more preferably, from 0.7 to 1.0, and the value of $c/a$ is from 0.01 to 1, or more preferably from 0.07 to 0.15. Such a siloxane is prepared by assorting, as a source of $SiO_2$ units, sodium silicate, alkyl silicate, polyalkyl silicate, or silicon tetrachloride; as a source of $R_3SiO_{0.5}$ units,

or $R_3SiCl$; and as a source of $CH_2\!\!=\!\!CH(R_2)O_{0.5}$ units, $CH_2\!\!=\!\!CH(R_2)SiOSi(R_2)CH\!\!=\!\!CH_2$ or

and cohydrolyzing them in the presence of an acid. The monovalent hydrocarbon radicals free of aliphatic unsaturation represented by R in the above-given unit formulas are methyl or phenyl radicals just as in the case of Component (1).

This Component (2) serves to improve the physical strength of the cured product prepared from the compositions of the invention (rubber). In order to obtain a good effect, it is recommended that from 30 to 70 parts by weight, or sometimes even an equal amount of Component (2) be added to 100 parts by weight of Component (1). However when no such effect is expected, Component (2) can be omitted from use.

Component (3) which is an organosiloxane copolymer is employed in order to improve the processability of the composition of the invention at the time of its curing. It controls the catalytic action of the platinum compound and helps maintain the fluidity of said composition for the required period of time. As mentioned above, its main chain is composed either of (d) $RR'SiO$ units alone or of (d) $RR'SiO$ units and (e) $R'SiO_{1.5}$ units, where the ratio of each of the units is $e/(d+e)\leq 0.5$. It comprises, in a comparatively higher ratio than Components (1) and (2) do, vinyl radicals bonded to silicon atoms: viz, at least 1 mole percent, or more preferably from 5 to 52.6 mole percent of monovalent hydrocarbon radicals represented by R' group is of vinyl radicals. This organosiloxane copolymer has its chain terminated with

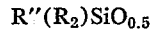

$R''OSi(R'_2)O_{0.5}$, or $HOSi(R'_2)O_{0.5}$ units. It is preferable that the monovalent hydrocarbon radicals free of aliphatic unsaturation as mentioned before in the definition of R and R' be methyl or phenyl radicals just as in the case of Components (1) and (2). The structure of such copolymers are exemplified as follows:

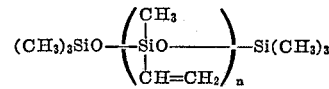

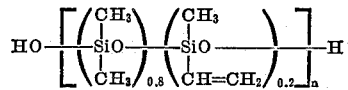

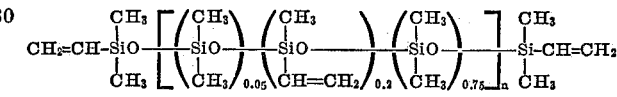

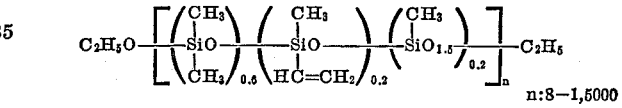

n:8—1,5000

The molecular chain of the organosiloxane copolymer is to be terminated with triorganosilyl radicals. The degree of polymerization of the copolymer is preferably at most 1500 in terms of siloxane units, or more preferably from 8 to 60, which is as much as to say that the organosiloxane copolymer should have a viscosity of from 10 to 1000 cs., or more preferably from 6 to 100 cs. at 25° C.

Even a small addition of this Component (3) acts to lengthen the pour time of the compositions of the invention. For example, when as small as 0.01 part by weight of Component (3) for every 100 parts by weight of Component (1) is added to the composition, it will somewhat contribute to lengthening the pour time and the greater the ratio of

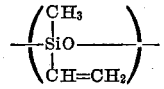

units in the Component (3), the greater will be the effect obtained.

It is to be noted, however, that the use of an excessive amount of Component (3) is apt to deteriorate the mechanical strength of the silicone rubber prepared. Therefore, the proper amount of it will be at most 200 parts by weight, usually at most 100 parts by weight, or more preferably at most 10 parts by weight, for every 100 parts by weight of Component (1). As previously stated, the addition of Component (3) to the composition of the invention has a remarkable effect. Such effect cannot be obtained by replacing a part of the monovalent carbon radicals, which are represented by R and which are present in the main chain of Component (1), by vinyl radicals. In the latter case, the pour time of the composition will be lengthened, but the mechanical properties of the cured product will be remarkably reduced, so that the applications of these products will be greatly limited.

The reaction taking place between the organohydrogen polysiloxane, employed as Component (4) and Components (1), (2) and (3), in the presence of a platinum catalyst given below, is an addition reaction, and the Component (4) cures them and gives silicone rubbers which have sufficient strength for practical uses. At least three Si-H bonds must be contained in one molecule of the component, and it is exemplified by organohydrogen siloxanes represented by:

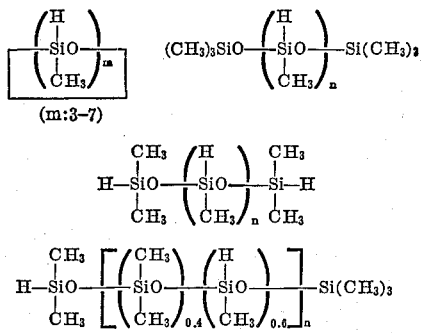

($m$:3–7)

($n$:8–500 in each case), or a copolymer consisting of:

units, $CH_3CiO_{1.5}$ units and $(CH_3)_2SiO$ units, or a copolymer consisting of:

units and $SiO_2$ units.

As previously stated, in order to give silicone rubbers of superior quality, the amount of Component (4) to be employed should be such that the total number of the Si-H bonds contained in it is from 50 to 500%, or more preferably from 150 to 300%, of that of vinyl radicals contained in Components (1), (2) and (3).

Component (5), which is an organic filler, is exemplified by finely divided silica such as fumed silica or silica aerogel, aluminum silicate, quartz powder, calcium carbonate, iron oxide, zinc oxide, and magnesium carbonate. The amount of the filler to be employed covers a wide range of from 1 to 500 parts by weight or more preferably from 5 to 500 parts by weight for every 100 parts by weight of Component (1). For the purpose of obtaining cured products having an extinguishing property, it is advisable to use quartz powder. An addition of from 30 to 200 parts by weight of such quartz powder will give a good effect.

The platinum catalyst, which is employed as Component (6), serves to promote at room temperature the addition reaction which takes place between the

bond and the $\equiv Si-H$ bond. It is exemplified by the well known finely divided elementary platinum, chloroplatinic acid, or complexes of olefines (e.g. ethylene, propylene, butadiene, and the like) and chloroplatinic acid. The property which is particularly desired of the catalyst is its solubility in the organopolysiloxanes which are the main componets of the compositions of the invention. Such platinum catalysts are described in U.S. Pats. 3,220,972 and 3,159,601. The amount of the catalyst to be added is generally from 0.5/1 million to 20/1 million part by weight (in terms of elementary platinum), based on the total weight of organopolysiloxane components contained in the compositions, so that proper pour time may be imparted to the compositions and so that when the work is finished they may be completely cured at room temperature.

The compositions of the invention are prepared by kneading on a roll, a kneader, or a Banbury mixer, the mixtures of the above-given Components (1), (2), (3), (4), (5) and (6). In preparing the mixture, usually Components (1), (2), (3) and (5) are first uniformly mixed. Components (4) and (6) are then added to the resultant mixture. In order to store the compositions for a long time, they must be divided into two packages, for example either Component (4) or (6) may be put in one package and the rest in the other. The two packages may then be mixed at the point of use.

The compositions thus prepared will be cured, for example, at room temperature in 24 hours. Thus they are especially recommended for sealing heat sensitive electronic parts. When heating does no harm, they may be heated, for example, to a temperature between 80 and 150° C. in order to carry out complete curing, thereby obtaining silicone rubbers of higher hardness. Whether they can be heated or not is decided in accordance with the applications to which the compositions are to be put.

The invention will be further described in greater detail in several examples in which parts are all parts by weight. Such physical properties as hardness, tensile strength and elongation of the cured products were all measured in accordance with JIS (Japanese Industrial Standard) C 2123.

EXAMPLE 1

Component (1): 100 parts of dimethylvinylsiloxy chain-stopped dimethyl polysiloxane, having a viscosity of 450 cs. at 25° C. and consisting of dimethylvinylsiloxy units and dimethylsiloxy units in the ratio of 1.2 moles:100 moles, Component (3): 3 parts of trimethylsiloxy chain-stopped organosiloxane copolymer, having a viscosity of 50 cs. at 25° C. and consisting of trimethylsiloxy units, methylvinylsiloxy units and dimethylsiloxy units in the ratio of 5 moles:20 moles:75 moles, Component (4): 7.5 parts of methylhydrogen polysiloxane, having a viscosity of 37 cs. at 25° C. and consisting of methylhydrogensiloxy units, methylsiloxy

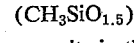

units, and dimethylsiloxy units in the ratio of 5.5 moles:2 moles:1.6 moles,

Component (5): 150 parts of quartz powder, and

Component (6): 0.1 part of 2-ethylhexanol solution containing 5% by weight of chloroplatinic acid hexahydrate dissolved in it.

When the above components were uniformly mixed, the mixture maintained its pour property for about 6 hours, thereby enabling potting or other processings to be carried out with ease. In 24 hours it was sufficiently cured to give a silicone rubber having a hardness of 45. When the mixture was heated to 90° C., it was cured in about 6 minutes into a silicone rubber whose hardness was 68.

As a control, a similar experiment was conducted in which all the components except Component (3) were employed. A mixture which gelled in about 3 minutes and lost fluidity was obtained. Still another similar experiment was carried out in which not only Component (3) was omitted but also the amount of Component (6) was reduced to 0.01 part. The mixture obtained gelled in about 5 minutes, and even 24 hours later, it gave an insufficiently cured soft silicone rubber whose surface was still sticky.

EXAMPLE 2

Component (1): 70 parts of dimethylvinylsiloxy chain-stopped dimethyl polysiloxane, having a viscosity of 3,000 cs. at 25° C., and consisting of dimethylvinylsiloxy units and dimethylsiloxy units in the ratio of 0.5 mole:100 moles, Component (2): 30 parts of organopolysiloxane consisting of $SiO_2$ units, dimethylvinylsiloxy units, and trimethylsiloxy units, in the ratio of 10 moles:1 mole:7 moles, Component (3): 0.5 part of trimethylsiloxy chain-stopped organosiloxane copolymer as defined in Example 1, Component (4): 5 parts of organohydrogen polysiloxane consisting of $SiO_2$ units and dimethylhydrogensiloxy units in the ratio of 1 mole:2 moles, Component (5): 40 parts of quartz powder, Component (6): 0.05 part of octylalcohol solution containing 5% by weight of chloroplatinic acid hexahydrate dissolved in it.

4 kinds of mixtures were prepared as follows of different assortments of the components given above, and their pour time and physical properties were studied. The results obtained are given in Table 1. Of the 4 kinds, D is the composition of the invention, and the others are the compositions prepared as controls.

Mixture A: Components (1), (2), (4) and (6)
Mixture B: Components (1), (2), (3), (4) and (6)
Mixture C: Components (1), (2), (4), (5) and (6)
Mixture D: All of the components given above.

TABLE 1

| Mixture | Pour time Minutes | Pour time Hours | Hardness of the mixture after 24 hours | When heated at 150° C. for 30 minutes Hardness | When heated at 150° C. for 30 minutes Tensile strength (kg./cm.²) | When heated at 150° C. for 30 minutes Elongation (percent) |
|---|---|---|---|---|---|---|
| A | | ca. 4 | 30 | 55 | 60 | 150 |
| B | | ca. 8 | 25 | 55 | 60 | 150 |
| C | ca. 5 | | | | | |
| D | | ca. 8 | 35 | 60 | 60 | 130 |

To determine its effects on the curing of the mixture, various amounts of tributyl phosphine were added to Mixture C. Tributyl phosphine serves to retard the activity of the platinum catalyst. The results which were obtained are given in Table 2. As is clear from the table, the addition of tributyl phosphine failed to impart to the mixtures the proper pour time as shown by the composition of the invention.

TABLE 2

| Amount of tributyl-phosphine added | Pour time Minutes | Pour time Days | Hardness of the mixture [1] |
|---|---|---|---|
| Parts: | | | |
| 0.001 | 5 | | |
| 0.002 | 5 | | |
| 0.003 | | 3 | 60 |
| 0.004 | | 7 | 60 |
| 0.006 | | 20 | 30 |
| 0.01 | | 30 | [2] |

[1] When heated at 150°C. for 30 minutes.
[2] Not cured.

When dimethylvinylsiloxy chain-stopped organopolysiloxane, having a viscosity of 3,000 cs. at 25° C. and consisting of dimethylvinylsiloxy units, dimethylsiloxy units and methylvinylsiloxy units in the ratio of 0.5 mole:98 moles:2 moles, was employed as Component (1) of Mixture (C), the mixture proved to have a pour time of 30 minutes, however, the tensile strength of the cured product was below 10 kg./cm.² and it was of no practical use.

EXAMPLE 3

Experiments were conducted, similar to Example 1, in which Component (3) employed in Example 1 was replaced by one of the following organosiloxane copolymers. The results obtained were as given in Table 3.

(a) 3 parts of dimethylvinylsiloxy chain-stopped organosiloxane copolymer, having a viscosity of 80 cs. at 25° C. and consisting of dimethylvinylsiloxy units, methylvinylsiloxy units, diphenylsiloxy units and dimethylsiloxy units in the ratio of 5 moles:15 moles:5 moles:75 moles, (b) 3 parts of dimethylvinyl siloxy chain-stopped organosiloxane copolymer, having a viscosity of 50 cs. at 25° C. and consisting of dimethylvinylsiloxy units, methylvinylsiloxy units and dimethylsiloxy units in the ratio of 5 moles:15 moles:80 moles, (c) 3 parts of trimethylsiloxy chain-stopped organosiloxane copolymer, having a viscosity of 50 cs. at 25° C., and consisting of trimethylsiloxy units, methylvinylsiloxy units and dimethylsiloxy units in the ratio of 5 moles:10 moles:85 moles, (d) 3 parts of trimethylsiloxy chain-stopped organosiloxane copolymer, having a viscosity of 60 cs. at 25° C. and consisting of trimethylsiloxy units, methylvinylsiloxy units and dimethylsiloxy units in the ratio of 5 moles:50 moles:45 moles, (e) 3 parts of trimethylsiloxy chain-stopped organosiloxane copolymer, having a viscosity of 600 cs. at 25° C., and consisting of trimethylsiloxy units, methylvinylsiloxy units, and dimethylsiloxy units in the ratio of 1 mole:20 moles:79 moles, (f) 3 parts of trimethylsiloxy chain-stopped organosiloxane copolymer, having a viscosity of 80,000 cs. at 25° C., and consisting of trimethylsiloxy units, methylvinylsiloxy units, and dimethylsiloxy units, in the ratio of 0.2 mole:20 moles:79.8 moles, (g) 3 parts of dimethylvinylsiloxy chain-stopped organopolysiloxane, having a viscosity of 10 cs. at 25° C., and consisting of dimethylvinylsiloxy units and dimethylsiloxy units in the ratio of 1 mole:4 moles.

TABLE 3

| Kind of component (3) | Pour time Hours | Pour time Minutes | Hardness of the mixture after 24 hours | Curing time at 90° C., minutes |
|---|---|---|---|---|
| a | 5 | 30 | 45 | 6 |
| b | 5 | 30 | 45 | 6 |
| c | 4 | | 50 | 5 |
| d | 12 | | 25 | 8 |
| e | 6 | | 45 | 6 |
| f | 5 | | 40 | 6 |
| g | | 5 | | |

EXAMPLE 4

Component (1): 100 parts of dimethylvinylsiloxy chain-stopped dimethylpolysiloxane, having a viscosity of 1200 cs. at 25° C., and consisting of dimethylvinylsiloxy units and dimethylsiloxy units in the ratio of .7 moles:100 moles, Component (3): 0.15 part of trimethylsiloxy chain-stopped organosiloxane copolymer as defined in Example 1, Component (4): 5 parts of methylhydrogen polysiloxane, having a viscosity of 20 cs. at 25° C. and consisting of methylhydrogensiloxy units, dimethylsiloxy units, and dimethylhydrogensiloxy units, in the ratio of 1 mole:2.53 moles:0.238 mole, Component (5): 50 parts of quartz powder, Component (6): 0.02 part of 2-ethylhexanol solution as defined in Example 1.

When the above components were uniformly mixed, the mixture maintained its pour property for 2 hours, and in 24 hours at 25° C., it was cured into a silicone rubber, having a hardness of 30. Another mixture prepared of similar components, with the exception of Component (3) gelled in 5 minutes, having lost its pour property.

EXAMPLE 5

Component (1): 100 parts of diphenylvinylsiloxy chain-stopped dimethylpolysiloxane, having a viscosity of 500 cs. at 25° C., and consisting of diphenylvinylsiloxy units and dimethylsiloxy units in the ratio of 1.2 moles:100 moles, Component (3): 100 parts of trimethylsiloxy chain-stopped organopolysiloxane copolymer, having a viscosity of 10 cs. at 25° C., and consisting of trimethylsiloxy units, methylvinylsiloxy units, and dimethylsiloxy units in the ratio of 1 mole:0.25 mole:3.75 moles, Component (4): 30 parts of organohydrogen polysiloxane, having a viscosity of 200 cs. at 25° C. and consisting of trimethylsiloxy units, methylhydrogensiloxy units and dimethylsiloxy units in the ratio of 2 moles:60 moles:200 moles, Component (5): 300 parts of quartz powder, Component (6): 0.2 part of 2-ethylhexanol solution as defined in Example 1.

When the above components were uniformly mixed, the mixture maintained its pour property for 4 hours. It was then allowed to stand for 24 hours at 25° C. A silicone rubber having a hardness of 25 was obtained.

EXAMPLE 6

Component (1): 100 parts of dimethylvinylsiloxy chain-stopped dimethylpolysiloxane, having a viscosity of 5,000 cs. at 25° C., and consisting of dimethylvinylsiloxy units and dimethylsiloxy units in the ratio of 0.45 mole: 100 moles, Component (2): 3 parts of organopolysiloxane as defined in Example 2, Component (3): 0.1 part of organopolysiloxane, having a viscosity of 20 cs. at 25° C., and consisting of $CH_3SiO_{1.5}$ units, $CH=CH_2(CH_3)SiO$ units,

$C_2H_5O(CH_3)_2SiO_{0.5}$ units, and $(CH_3)_2SiO$ units in the ratio of 1 mole:4 moles:3 moles:11 moles, Component (4): 5 parts of organohydrogen polysiloxane as defined in Example 4, Component (5): 5 parts of fumed silica having a surface area of 200 m.²/g., Component (6): 1 part of platinum catalyst scattered over a carrier of diatomaceous earth prepared by dipping 5 g. of diatomaceous earth in 100 cc. of 0.025% aqueous solution of chloroplatinic acid hexahydrate, removing it, drying it in a thermostatic air bath at 125° C. for 20 hours, and then reducing it for about 1 hour in a hydrogen current at a temperature between 330° C. and 350° C.

When the above components were uniformly mixed, the mixture maintained its pour property for 1 hour. It was then allowed to stand for 24 hours at 25° C. A silicone rubber having a hardness of 20 was obtained. Another experiment in which 0.1 part of 3% octyl alcohol solution of $Pt\text{-}Cl_2 \cdot S(C_2H_5)_2$ was employed instead of the platinum catalyst mentioned above, gave similar results. However in still another experiment, in which no Component (3) was used, a mixture which gelled in about 5 minutes was obtained.

What is claimed is:

1. An organopolysiloxane reaction product curable at room temperature prepared by admixing:
   (1) 100 parts by weight of an organopolysiloxane having a viscosity of from 10 to 300,000 cs. at 25° C., and represented by the general formula:

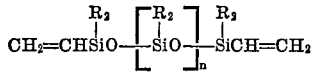

(where R is a methyl or phenyl radical, and $n$ is an integer of from 8 to 1500), (2) from 0.01 to 200 parts by weight of an organopolysiloxane whose main chain is composed of RR'SiO units and whose main chain is terminated with $R''(R_2)SiO_{0.5}$ units, (where R is as previously defined, and at least 1 mole percent of R' is of vinyl radicals, the balance of R' being a methyl or phenyl radical, and R" is a methyl, phenyl or vinyl radical),
   (3) an organohydrogen polysiloxane in which the total number of Si-H bonds is from 50 to 500% of that of vinyl radicals contained in Components (1) and (2) given above, and which contains at least three Si-H bonds in one molecule,
   (4) from 1 to 500 parts by weight of an inorganic filler, and
   (5) a catalytic amount of a platinum compound.

2. The organopolysiloxane reaction product claimed in claim 1, to which is added from 30 to 100 parts by weight of an organosiloxane copolymer consisting of (a) $SiO_2$ units, (b) $R_3SiO_{0.5}$ units, and (c) $CH_2=CH(R_2)SiO_{0.5}$ units, (where R is selected from the group consisting of methyl and phenyl radicals, and the molecular ratio of each of the units is represented by $(b+c)/a=0.3\text{-}3$, $c/a=0.01\text{-}1$).

3. An organopolysiloxane reaction product curable at room temperature prepared by admixing:
   (1) 100 parts by weight of an organopolysiloxane having a viscosity of from 10 to 300,000 cs. at 25° C.. and represented by the general formula:

(where R is a methyl or phenyl radical, and $n$ is an interger of from 8 to 1500), (2) from 0.01 to 100 parts by weight of an organopolysiloxane, composition units of whose main chain is only RR'SiO units, and whose main chain is terminated with $R''(R_2)SiO_{0.5}$ units, (where R is as previously defined, at least 1 mole percent of R' group is of vinyl radicals, and the balance of R' being a methyl or phenyl radical, and R" is selected from the group consisting of methyl, phenyl and vinyl radicals),
   (3) an organohydrogen polysiloxane in which the total number of Si-H bonds is from 150 to 300% of that of vinyl radicals containing in Components (1) and (2) given above, and which comprises at least three Si-H bonds in one molecule,
   (4) from 5 to 500 parts by weight of an inorganic filler, and
   (5) from $0.5 \times 10^{-6}$ to $20 \times 10^{-6}$ parts by weight of a platinum catalyst based on the weight of Componets (1), (2) and (3) given above.

4. The organopolysiloxane reaction product claimed in claim 2, to which are added from 30 to 70 parts by weight of an organosiloxane copolymer consisting of (a) $SiO_2$ omits, (b) $R_3SiO_{0.5}$ units, and (c) $CH_2=CH(R_2)\text{---}SiO_{0.5}$ units, (where R is a methyl or phenyl radical, and the molecular ratio of each of the units is given by $(b+c)/a=0.6\text{-}2$, and $c/a=0.07\text{-}0.15$).

5. The organopolysiloxane reaction product claimed in claim 2 in which Component (2) is an organosiloxane copolymer, having a viscosity of from 10 to 1,000 cs. at 25° C.

6. The organopolysiloxane reaction product claimed in claim 2 in which the inorganic filler is selected from the group consisting of pulverized silica, aluminum silicate, quartz powder, calcium carbonate, iron oxide, zinc oxide and magnesium carbonate.

7. The organopolysiloxane reaction product claimed in claim 2 in which the platinum compound is selected from the group consisting of finely divided elementary platinum, chloroplatinic acid, and complexes of olefines and chloroplatinic acid.

References Cited

UNITED STATES PATENTS 3,527,655   9/1970   Ballard _____ 260—825 X
3,425,967   2/1969   Modic _____ 260—37 SB X
3,284,406   11/1966  Nelson _____ 260—825 X LEWIS T. JACOBS, Primary Examiner U.S. Cl. X.R.

260—825